3,616,829
HARD METAL INSERT FOR SOFT METAL BODIES
Leslie A. Runton, Canton, Mass., assignor to Phillips
Screw Company, Natick, Mass.
Filed Apr. 23, 1970, Ser. No. 43,297
Int. Cl. F16b 39/06
U.S. Cl. 151—23    9 Claims

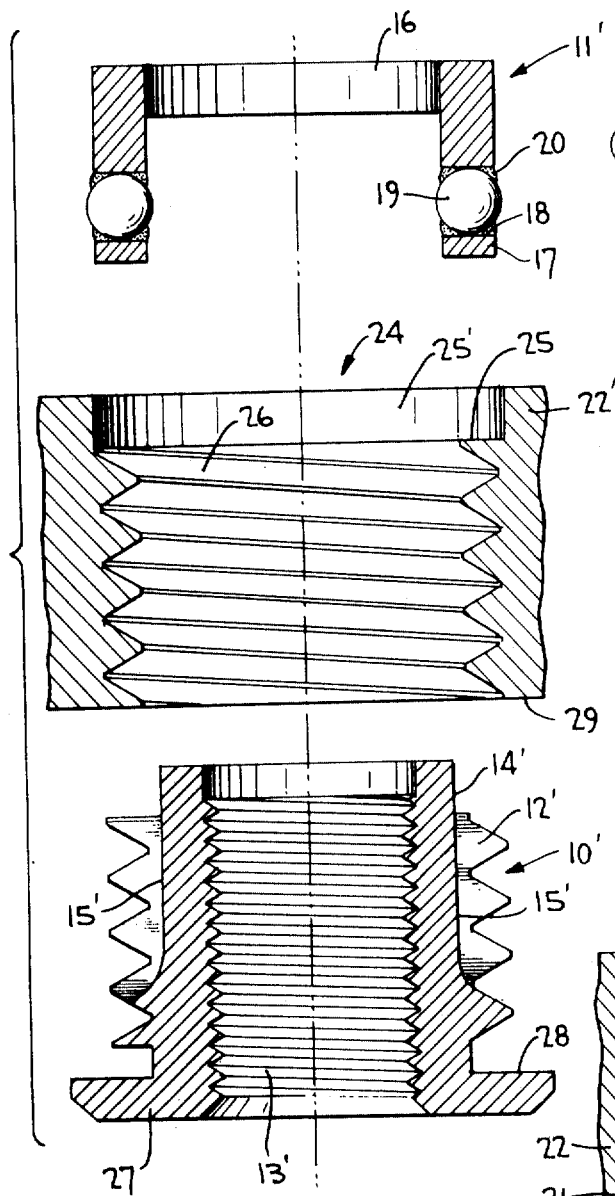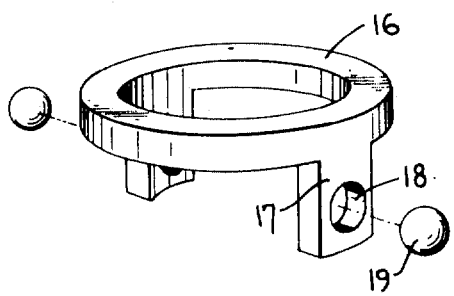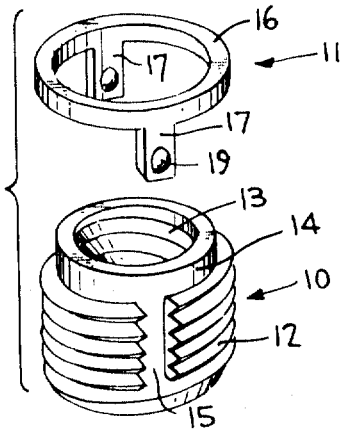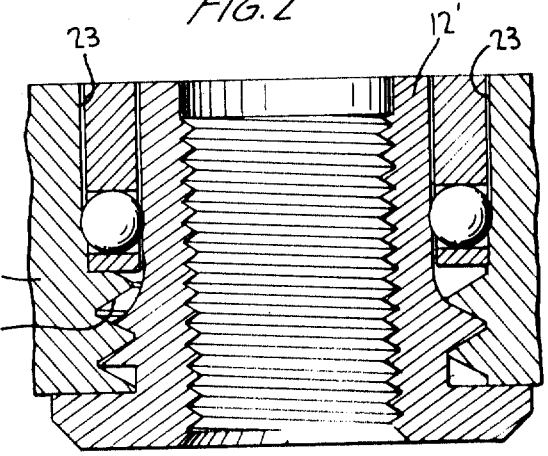
Nov. 2, 1971     L. A. RUNTON     3,616,829
HARD METAL INSERT FOR SOFT METAL BODIES
Filed April 23, 1970
INVENTOR,
LESLIE A. RUNTON
BY Watson, Cole, Grindle & Watson
ATTORNEYS

ABSTRACT OF THE DISCLOSURE

In a device comprising an internally and externally threaded tubular hard metal insert for anchoring threaded elements in soft metal parent bodies, the external thread being interrupted by at least one keyway extending axially through a plurality of turns of said thread, and a locking member having at least one tang dimensioned to fit tightly into said keyway, a corresponding keyway being broached through the thread of a threaded insert-receiving aperture in said parent body as said locking member is driven home, the improvement consisting in providing each tank with a radially extending circular aperture therethrough and securing a hard metal ball in said aperture so as to extend slightly beyond each circumferential surface of the tang whereby when the tang is driven home the said ball is under compression between the outer wall of the insert and the adjacent metal of the parent body, enhancing the locking effect as well as ensuring a tighter fit between the insert and the threaded element to be received therein. In a special embodiment the insert is formed with an outwardly directed annular flange at one end, for seating against the inner surface of a cylinder head, to eliminate leakage around the insert and also to prevent the latter from being dislodged by reason of the internal pressure when the insert is used for anchoring a spark plug in the cylinder head of an internal combustion engine.

---

The present invention relates to hard metal inserts for anchoring threaded elements in parent bodies of soft metal, such as aluminum, and particularly to certain improvements upon the type of insert disclosed in Cummaro U.S. Pat. No. 2,783,811. That insert comprises, broadly, a tubular member of relatively hard metal, as a suitable steel or other alloy, threaded externally for engagement in a tapped hole in the parent body and threaded internally to receive the element to be anchored, and a locking member comprising a ring adapted to encircle an unthreaded neck at one end of the tubular member, two parti-cylindrical tangs formed integrally with the ring being shaped and dimensioned to fit tightly into corresponding keyways which interrupt the external thread on the tubular member.

According to the present invention, each of the aforesaid tangs is provided with a circular aperture extending radially through the tang, and a hard metal ball fixed in said aperture so as to project slightly beyond each circumferential surface of the tang. Thus, when the tangs are driven into their respective keyways, the said balls are put under compression between the parent body and the tubular insert, enhancing the locking of the insert in the parent body and also tending to cause a slight deformation of the insert which results in a tighter fit of the threaded element in the internal thread of the insert. In a special embodiment, intended for receiving a spark plug in a cylinder head, an external annular flange is formed at one end of the tubular member, a surface of said flange being adapted to seat tightly against the inner surface of the cylinder head to prevent gas leakage around the insert and also to ensure that the latter is not dislodged by the pressure created during each explosion within the cylinder.

Accordingly, it is an object of the invention to provide an insert of the type described, having radial apertures extending through the tangs, said apertures being circular and of a diameter slightly in excess of the radial thickness of the tangs, hard metal balls being fixed in said apertures so as to project slightly beyond each circumferential surface of the associated tang. Suitably the balls are so fixed adhesively, preferably by means of epoxy resin.

A further object is the provision, in an insert such as described in the preceding paragraph, of an external annular flange at one end of the tubular member.

Other and further objects, features and advantages will be apparent from the description which follows, taken in connection with the accompanying drawings, in which FIG. 1 is an exploded axial sectional view of one embodiment of the invention prior to installation in a cylinder head, which latter is shown as a fragment only;

FIG. 2 is an axial section showing the embodiment of FIG. 1 after installation;

FIG. 3 is an exploded perspective view of the locking member of FIGS. 1, 2 and 4; and FIG. 4 is an exploded perspective of a second embodiment of the invention.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Because of its greater range of utility, the embodiment seen in FIG. 4 will be first described. The insert there illustrated is in most respects similar to that disclosed in U.S. Pat. 2,783,811 and comprises generally an internally and externally threaded tubular member 10 and a locking member 11. Both of these members are of relatively hard and tough metal, for example a suitable steel. The tubular member 10 is provided with an external thread 12 for engagement with the thread of a tapped hole in a parent body such as a cylinder block or other body in which it is desired to anchor a threaded element. The member 10 is also internally threaded as at 13 to receive the said element. The external thread 12 is terminated short of the upper end of the element 10 to leave an unthreaded neck portion 14 at the upper end of member 10. Two axially directed grooves or keyways 15 are formed at diametrically opposite areas of the member 10 and each extends from the neck 14 through at least several turns of the thread 12.

The locking members 11 comprises a ring 16 dimensioned to fit snugly about the neck 14 of the member 10, with two integral oppositely disposed parti-cylindrical tangs 17 dimensioned to fit tightly into the keyways 15, all as described in the aforesaid U.S. patent.

The improvement of the present invention lies in providing each tang 17 with a radially extending aperture 18 (see FIG. 3) therethrough, of a diameter slightly exceeding the radial thickness of the tangs 17, and securng in each aperture 18 a hard metal ball 19 of a diameter to fit snugly in its associated aperture 18 and to project slightly beyond each circumferential surface of the associated tang 17. The balls 19 are secured in the aperture 18 by means of an adhesive 20 (see FIG. 1), preferably epoxy resin. When the locking member 11 is driven into locking position (see FIG. 2) the tangs 17 broach keyways through the soft metal thread 21 of the parent body 22 and, at the same time, the balls 19 being under compression between the parent body 22 and the tubular member 12 (12' in FIG. 2) are caused to form shallow grooves 23 in the parent body 22, enhancing the security of the member 10 against inadvertent rotation in the parent body. Also, the pressure of the balls 19 against the wall of the tubular member 12 or 12' causes the latter to deform slightly toward an oval shape, ensuring a tighter fit between the internal thread 13 and the threaded element to be anchored.

The embodiment illustrated in FIGS. 1 and 2 is especially useful in connection with removable cylinder heads of internal combustion engines such as are commonly used to power lawn mowers, outboard motor boats, motorcycles, snow blowers, etc. These air-cooled engines, frequently made of aluminum, are quite sensitive in performance and are given to frequent fouling of the spark plugs. When one of the latter is removed for cleaning or replacement, and the cleaned or new plug is threaded into the soft metal cylinder head, often the threads are crossed or damaged, resulting in poor performance of the engine or necessitating replacement of the cylinder head. This situation may be corrected by means of the present invention, using the embodiment shown in FIGS. 1 and 2.

The parent body 22', in this case a cylinder head, is first drilled with a stepped drill to remove the damaged threads and provide an untapped hole 24 with a countersunk shoulder 25, the wall of the countersink being designated at 25'. The hole 24 is then provided with an internal thread 26, to receive the external thread 12' of the tubular member 10'. Such external thread is interrupted by oppositely disposed keyways 15' like the keyways 15 of FIG. 4, and the member 10' is provided with an internal thread 13' of a diameter and thread form to receive a suitable spark plug. The member 10' is formed to provide, at its lower or inner end, an outwardly projecting annular flange 27 of a diameter exceeding that of the thread 12', which flange 27 has an upper surface 28 adapted to seat tightly against the lower or inner surface 29 of the cylinder head 22'.

The locking members 11' is similar to the member 11 of FIG. 4, the ring 16 being of a size to encircle the neck 14' of the member 10' and to fit within the countersink 25, 25' of the cylinder head 22'.

In applying the insert of FIGS. 1 and 2, the cylinder head 22' being removed from the engine, the tubular member 10' is threaded in from the inner or lower side of the head 22' until the surface 28 of the flange 27 is firmly seated against the surface 29 of the head. The locking member 11' is then driven in from the other side of the head until the tangs 17 are tightly engaged in the keyways 15' and the ring 16 rests on the shoulder 25. Thus, a hard metal thread 13' is ready to receive a spark plug, while the flange 27 inhibits leakage of gas around the insert 10' as well as preventing the latter from being dislodged by reason of internal pressure which might otherwise cause failure of the soft thread 26 of the cylinder head.

Having thus described the invention, what is claimed as new and desired to be secured by Letters Patent is:

1. A spark plug receptacle for internal combustion engines having cylinder heads of relatively soft metal such as aluminum, said receptacle comprising a cylindrical tubular member of relatively hard metal having an outwardly projecting annular flange at one end, the inner surface of said member being threaded from said flanged end to a point adjacent the other end of said member to receive the sparking end of a conventional spark plug, said flange having a surface formed to seat tightly against the inner surface of a cylinder head, the outer surface of said member being threaded from a point adjacent said seating surface of said flange to a point adjacent but spaced from the other end of said member whereby a short unthreaded neck is provided at said other end, the thread crest diameter of said outer thread being less than the diameter of said flange, said outer thread being interrupted by at least one keyway extending axially through a plurality of turns of said thread, and a locking member of relatively hard metal in the form of a circular ring having an inner diameter substantially equal to the outer diameter of said unthreaded neck and at least one integral parti-cylindrical tang dimensioned to fit closely into said keyway, each said tang having a radial aperture extending therethrough, said aperture being circular and of a diamter slightly greater than the radial thickness of said tang, and a spherical member of relatively hard metal, of a diameter to fit closely within said aperture, secured within said aperture so as to project slightly beyond each circumferential surface of its associated tang.

2. The combination defined in claim 1, said tubular member having two said keyways disposed at diametrically opposite locations and said locking member having two said tangs similarly disposed.

3. The combination defined in claim 1, said spherical member being secured in said aperture by means of a hard setting adhesive material.

4. The combination defined in claim 1, said spherical member being secured in said aperture by means of epoxy resin.

5. An insert for anchoring threaded elements in bodies of relatively soft metal such as aluminum, said insert comprising a cylindrical tubular member of relatively hard metal threaded internally and externally, the outer thread being interrupted by at least one keyway extending axially through a plurality of turns of said thread, and a locking member of relatively hard metal comprising at least one parti-cylindrical tang dimensioned to fit closely into said keyway, each said tang having a radial aperture extending therethrough, said aperture being circular and of a diameter slightly greater than the radial thickness of said tang, and a spherical member of relatively hard metal, of a diameter to fit closely within said aperture, secured within each said aperture so as to project slightly beyond each circumferential surface of its associated tang.

6. Th ecombination defined in claim 5, said tubular member having two said keyways disposed at diametrically opposite locations and said locking member having two said tangs similarly disposed.

7. The combination defined in claim 5, said spherical member being secured in said aperture by means of a hard setting adhesive material.

8. The combination defined in claim 5, said spherical member being secured in said aperture by means of epoxy resin.

9. The combination defined in claim 6, said tubular member having an unthreaded neck portion at one end thereof, said locking member comprising a circular ring having an inner diameter substantially equal to the outer diameter of said unthreaded neck, said tangs being integral with said ring.

References Cited
UNITED STATES PATENTS 2,783,811 3/1957 Cummaro.
3,462,539 8/1969 Winston.

EDWARD C. ALLEN, Primary Examiner

U.S. Cl. X.R.

151—8